US011301128B2

(12) United States Patent
Adem

(10) Patent No.: US 11,301,128 B2
(45) Date of Patent: Apr. 12, 2022

(54) INTENDED INPUT TO A USER INTERFACE FROM DETECTED GESTURE POSITIONS

(71) Applicant: Google LLC, Mountain View, CA (US)

(72) Inventor: Richard Hasim Adem, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/400,857

(22) Filed: May 1, 2019

(65) Prior Publication Data
US 2020/0348836 A1    Nov. 5, 2020

(51) Int. Cl.
G06F 3/0488 (2013.01)
G06F 3/041 (2006.01)
G06F 3/044 (2006.01)
G06F 3/04883 (2022.01)

(52) U.S. Cl.
CPC ........ *G06F 3/04883* (2013.01); *G06F 3/0416* (2013.01); *G06F 3/044* (2013.01)

(58) Field of Classification Search
CPC .. G06F 3/04186; G06F 3/0418; G06F 3/0484; G06F 3/04847; G06F 3/048; G06F 3/0485; G06F 3/04855
See application file for complete search history.

(56) References Cited

U.S. PATENT DOCUMENTS

| | | | |
|---|---|---|---|
| 5,454,043 A | 9/1995 | Freeman | |
| 7,577,925 B2 * | 8/2009 | Zotov | G06F 3/017 715/863 |
| 7,952,566 B2 * | 5/2011 | Poupyrev | G06F 3/03547 345/173 |
| 8,046,721 B2 * | 10/2011 | Chaudhri | G06F 3/0484 715/863 |
| 8,159,455 B2 * | 4/2012 | Leung | G06F 3/03543 345/156 |
| 8,436,827 B1 * | 5/2013 | Zhai | G06F 3/0488 345/173 |
| 8,487,896 B1 * | 7/2013 | Brown | G06F 3/0416 345/173 |
| 8,547,466 B2 * | 10/2013 | Chao | G06F 3/04883 348/333.01 |
| 8,645,827 B2 * | 2/2014 | Beaver | G06F 3/0481 715/702 |
| 8,660,978 B2 * | 2/2014 | Hinckley | G06F 3/04883 706/52 |

(Continued)

FOREIGN PATENT DOCUMENTS

EP    2717150    4/2014

OTHER PUBLICATIONS

"International Search Report and Written Opinion", PCT Application No. PCT/US2019/062782, dated Apr. 1, 2020, 19 pages.

(Continued)

*Primary Examiner* — Michael J Jansen II
(74) *Attorney, Agent, or Firm* — Colby Nipper PLLC

(57) ABSTRACT

The present disclosure describes techniques and systems directed to determining an intended input to a user interface from detected gesture positions. The described techniques and systems include detecting positions associated with a gesture made relative the user interface, associating a timing profile to the detected positions, and determining, from the detected positions and the associated timing profile, the intended input to the user interface.

20 Claims, 7 Drawing Sheets

(56) References Cited

U.S. PATENT DOCUMENTS

| | | | |
|---|---|---|---|
| 8,791,913 B2* | 7/2014 | Kawalkar | G06F 3/041 345/173 |
| 8,937,602 B2* | 1/2015 | Zanone | G06F 3/0418 345/173 |
| 9,063,611 B2* | 6/2015 | Brown | G06F 3/0416 |
| 9,092,085 B2* | 7/2015 | Chow | G06F 3/041 |
| 9,141,197 B2* | 9/2015 | MacDougall | G06F 3/017 |
| 9,223,423 B2* | 12/2015 | Taby | G06F 3/0418 |
| 9,411,507 B2* | 8/2016 | Moore | G06F 3/04883 |
| 9,524,050 B2* | 12/2016 | Zhai | G06F 3/0488 |
| 9,720,587 B2* | 8/2017 | Matsuki | G06F 3/0485 |
| 9,778,749 B2* | 10/2017 | Poupyrev | G06F 3/017 |
| 9,836,204 B1* | 12/2017 | Huang | G06F 3/04812 |
| 9,852,761 B2* | 12/2017 | Anzures | G11B 27/34 |
| 9,996,231 B2* | 6/2018 | Missig | G06F 3/04886 |
| 10,191,627 B2* | 1/2019 | Cieplinski | G06F 3/04842 |
| 10,289,249 B2* | 5/2019 | Akita | B60K 35/00 |
| 10,416,800 B2* | 9/2019 | Karunamuni | G06F 3/04883 |
| 10,488,939 B2* | 11/2019 | Karmon | G06F 3/0304 |
| 10,613,656 B2* | 4/2020 | Nilo | G06F 3/0416 |
| 2002/0015064 A1* | 2/2002 | Robotham | G06F 3/04883 715/863 |
| 2006/0082540 A1* | 4/2006 | Prior | G06F 3/0202 345/156 |
| 2006/0227116 A1* | 10/2006 | Zotov | G06F 3/0418 345/173 |
| 2008/0024459 A1* | 1/2008 | Poupyrev | G06F 3/016 345/173 |
| 2008/0278455 A1* | 11/2008 | Atkins | G06F 3/0488 345/173 |
| 2009/0228901 A1* | 9/2009 | Beaver | G06F 3/0416 719/318 |
| 2009/0284495 A1* | 11/2009 | Geaghan | G06F 3/0416 345/174 |
| 2010/0013768 A1* | 1/2010 | Leung | G01C 9/00 345/163 |
| 2010/0235746 A1* | 9/2010 | Anzures | G11B 27/34 715/723 |
| 2011/0074694 A1* | 3/2011 | Rapp | G06F 3/04845 345/173 |
| 2012/0158629 A1* | 6/2012 | Hinckley | G06F 3/0418 706/15 |
| 2012/0324403 A1* | 12/2012 | Van De Ven | G06F 3/0488 715/863 |
| 2013/0002600 A1* | 1/2013 | McCracken | G06F 3/044 345/174 |
| 2013/0067332 A1* | 3/2013 | Greenwood | G06F 3/0488 715/720 |
| 2013/0135209 A1* | 5/2013 | Zhai | G06F 3/0488 345/168 |
| 2013/0194193 A1* | 8/2013 | Kawalkar | G06F 3/04883 345/173 |
| 2013/0271360 A1* | 10/2013 | Macdougall | H04M 1/72519 345/156 |
| 2014/0028579 A1* | 1/2014 | Taby | G06F 3/017 345/173 |
| 2014/0092032 A1* | 4/2014 | Moore | G06F 3/167 345/173 |
| 2014/0152590 A1* | 6/2014 | Brown | G06F 3/0416 345/173 |
| 2015/0067519 A1* | 3/2015 | Missig | G06F 3/016 715/732 |
| 2015/0067560 A1* | 3/2015 | Cieplinski | G06F 3/04883 715/765 |
| 2015/0160774 A1* | 6/2015 | Zhai | G06F 3/0488 345/173 |
| 2016/0054803 A1* | 2/2016 | Poupyrev | G01S 13/88 345/156 |
| 2016/0103506 A1* | 4/2016 | Matsuzaki | G06F 3/04883 345/156 |
| 2016/0103574 A1* | 4/2016 | Kankaanpaa | G11B 27/34 715/720 |
| 2016/0291860 A1* | 10/2016 | Higuchi | G06F 3/04883 |
| 2016/0328134 A1* | 11/2016 | Xu | G06F 3/04886 |
| 2017/0046038 A1* | 2/2017 | Hajas | G06F 3/04883 |
| 2017/0046059 A1* | 2/2017 | Karunamuni | G06F 3/0416 |
| 2017/0060254 A1* | 3/2017 | Molchanov | G06N 3/0454 |
| 2018/0024540 A1* | 1/2018 | Livesay | G05B 19/41835 715/736 |
| 2018/0039377 A1* | 2/2018 | Akita | B60K 35/00 |
| 2018/0160165 A1* | 6/2018 | Cormican | H04N 21/42224 |
| 2018/0164995 A1* | 6/2018 | Czupi | G06F 3/0486 |
| 2018/0307319 A1* | 10/2018 | Karmon | G06K 9/00389 |
| 2019/0026015 A1* | 1/2019 | Lee | G06F 3/0488 |
| 2019/0073051 A1* | 3/2019 | Nilo | G06F 3/041 |
| 2019/0310755 A1* | 10/2019 | Sasaki | G06F 3/041 |
| 2020/0218376 A1* | 7/2020 | Nilo | G06F 3/041 |
| 2020/0348836 A1* | 11/2020 | Adem | G06F 3/04883 |
| 2020/0371675 A1* | 11/2020 | Sung | G11B 27/005 |

OTHER PUBLICATIONS

"Invitation to Pay Additional Fees", PCT Application No. PCT/US2019/062782, Feb. 11, 2020, 13 pages.

"International Preliminary Report on Patentability", Application No. PCT/US2019/062782, dated Nov. 2, 2021, 14 pages.

* cited by examiner

INTENDED INPUT TO A USER INTERFACE FROM DETECTED GESTURE POSITIONS

BACKGROUND

A user interface of a computing device, such as a touchscreen of a tablet, offers multiple functions to a user. In addition to providing a visual output to the user through a display, the example touchscreen provides a mechanism for the user to provide inputs to control the computing device or interact with an application that is executing on the computing device. These touch techniques often rely on a position-detection mechanism that uses a capacitive, resistive, reflective, or grid-interruption technology. These touch techniques enable a user to provide an input to the user interface, such as a drag-and-drop input, a scrolling input, or an icon-selection input. To do so, the position-detection mechanism of the touchscreen detects positions of the gesture. These detected positions often do not reflect a user's intended input, however.

SUMMARY

The present disclosure describes techniques and systems directed to determining an intended input from detected gesture positions. The described techniques and detect positions with a gesture made relative to a user interface, associate a timing profile to the detected positions, and determine, from the detected positions and the associated timing profile, an intended input to the user interface.

In some aspects, a computing device is described. The computing device includes a user interface having a display, a position-detection mechanism, a processor, and a computer-readable media having executable instructions of a position-detection manager. The position-detection manager, as executed by the processor, directs the computing device to detect, through the position-detection mechanism, positions associated with a gesture, where the gesture is made by a user of the computing device relative to a user interface of the computing device. The position-detection manager further directs the computing device to associate, to the positions detected relative to the user interface, a timing profile and a context. Using the associated timing profile and the associated context, the position-detection manager directs the computing device to determine an intended input by the user and to perform an operation that corresponds to the determined, intended input.

In other aspects, a method performed by a computing device is described. The method includes the computing device detecting positions associated with a gesture that is made by a user of the computing device relative to a touchscreen of the computing device. After associating a timing profile to the detected positions, the computing device determines an intended input by the user and performs an operation corresponding to the determined, intended input.

In yet other aspects, a method performed by a computing device is described. The method includes the computing device detecting positions associated with a gesture that is made by a user of the computing device relative to a touchscreen of the computing device. After associating a context to the detected positions, the computing device determines an intended input by the user and performs an operation corresponding to the determined, intended input.

BRIEF DESCRIPTION OF THE DRAWINGS

This document describes details of one or more aspects of determining an intended input to a user interface from detected gesture positions. The use of the same reference numbers in different instances in the description and the figures may indicate like elements.

DETAILED DESCRIPTION

The present disclosure describes techniques and systems for determining an intended input to a user interface from detected gesture inputs. While features and concepts of the described systems and methods for determining an intended input to a user interface from detected gesture positions can be implemented in any number of different environments, systems, devices, and/or various configurations, aspects are described in the context of the following example devices, systems, and configurations.

Overview

A user interface of a computing device often includes a position-detection mechanism to detect positions of a gesture and provide an input to the computing device. Various factors can negatively affect the position-detection mechanism's ability to determine a user's intended input, such as a resolution of a display of the computing device, biomechanics of a user's finger, and gauge capabilities of the position-detection mechanism, as well as others. Because of this failure, the computing device may perform a function that was not intended by a user, or perform an intended function but in a way not intended by the user.

As an example, consider an instance where a user is scrolling his finger along a progress bar displayed on a touchscreen, where the progress bar corresponds to a timeline of a video available through a video-player application. The user may stop scrolling his finger at an intended position along the progress bar that highlights a time marker corresponding to a segment of the video he would like to watch. However, when the user lifts his finger from the touchscreen, he may unintentionally roll or slide his finger such that the position-detection mechanism detects the user's finger disengaging from the touchscreen at a position that is other than one intended by the user. In such an instance, the position-detection mechanism may associate the other, non-intended position to the input of the user and, rather than causing the video application to queue the segment of the video that the user desires to watch, queue a different segment of the video.

This document describes techniques and systems that are designed to improve the computing device's ability to determine the intended input from detected gesture positions. The described techniques and systems include a computing device having a position-detection manager. The position-detection manager causes the computing device to determine the intended input of a gesture by (i) associating a timing profile to detected positions of the gesture and/or (ii) associating a context surrounding the computing device to the gesture.

Operating Environment

Figure 1:
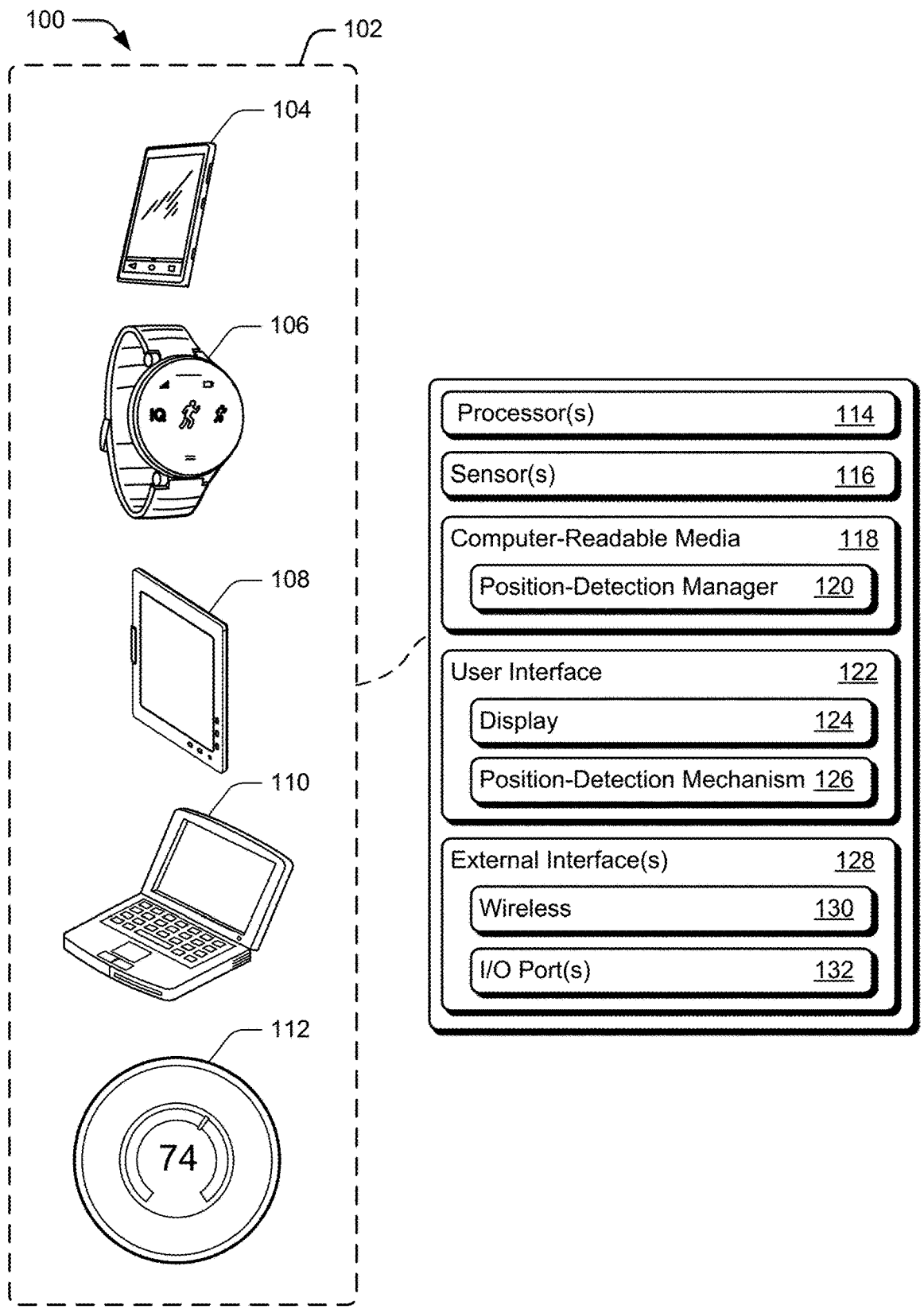
FIG. 1 illustrates an example operating environment in which various aspects of determining an intended input to a user interface from detected gesture inputs are implemented.

FIG. 1 illustrates an example operating environment 100 in which various aspects of determining an intended input to a user interface from detected gesture inputs are implemented. The operating environment 100 includes a computing device 102, non-limiting examples of which include a smartphone 104, a wearable device 106, a tablet 108, a computer 110, and a home-automation control 112.

The computing device 102 includes one or more processors(s) 114 with logic capabilities. The processor 114 may be a single core processor or a multiple core processor composed of a variety of materials, such as silicon, polysilicon, high-K dielectric, copper, and so on. The processor 114, furthermore and in general, includes clocking mechanisms for performing timing operations.

The computing device 102 also includes one or more sensor(s) 116, such as a GPS sensor, a proximity sensor, an accelerometer, a radar sensor, a radio-frequency identification (RFID) sensor, a near-field communication (NFC) sensor, or the like. The one or more sensors(s) 116 may be used to sense conditions surrounding the computing device 102, including an identity of a user of the computing device.

The computing device 102 also includes a computer-readable storage media (CRM) 118 that includes executable instructions of a position-detection manager 120. The computer-readable storage media described herein excludes propagating signals. The CRM 118 may include any suitable memory or storage device such as random-access memory (RAM), static RAM (SRAM), dynamic RAM (DRAM), non-volatile RAM (NVRAM), read-only memory (ROM), or Flash memory useable to store the executable instructions of the position-detection manager 120. The position-detection manager 120 may include drivers for managing position-detection mechanisms, machine-learning algorithms, and a buffer for storing data. The computing device 102 also includes a user interface 122 that includes a display 124 and a position-detection mechanism 126.

The position-detection manager 120 (e.g., the processor 114 executing the instructions of the position detection-manager 120) directs the computing device 102 to perform a series of operations to determine an intended input by a user of the computing device 102. The operations may include (i) detecting, through the position-detection mechanism 126, positions associated with a gesture that is made by the user of the computing device 102 relative to the user interface 122, (ii) associating, to the positions detected relative to the user interface 122, a timing profile and/or a context, (iii) determining, using the detected positions and the associated timing profile and/or context, an intended input by the user, and (iv) performing an operation corresponding to the intended input.

The combination of the display and the position-detection mechanism 126 enable a user to provide an input to the user interface through gesturing. Such an input may include the user performing a gesture to scroll, select, zoom, edit, or tap features presented by the display 124. Such features may be associated with an application executing on the device or an application that is executing remotely (e.g., a cloud-based application). Examples include a progress bar (e.g., a progress indicator associated with a media application), a control input (e.g., an alarm control of a home-alarm system), a link such as a uniform resource locator (e.g., a URL), and a selectable drop-down menu item.

In one example instance, the user interface 122 is a touchscreen, where the position-detection mechanism 126 is integrated into the display 126. In the instance of the user interface 122 being a touchscreen, the position-detection mechanism 126 may rely on a capacitive, resistive, reflective, or grid-interruption technologies to receive the input. In this example instance, the position-detection mechanism 126 (under the direction of the position-detection manager 120) may detect positions that are associated with a gesture made by the user (e.g., positions of the user's finger or hand) relative to the user interface 122 (e.g., the touchscreen).

In another example instance of the user interface 122, the position-detection mechanism 126 is separate from the display 124. In this other example instance, the position-detection mechanism 126 includes an image sensor, a mouse, or a radar sensor, each of which may (under the direction of the position-detection manager 120) detect the positions that are associated with the gesture and that correlate to movement or location of a cursor presented through the display 124.

The computing device 102 also includes hardware that supports one more external interface(s) 128, comprised of a wireless interface 130 and input/output (I/O) ports 132 for interfacing with other devices. Such other devices may include, for example, the position-detection mechanisms that are separate from the display (e.g. the image sensor, the mouse, or the radar sensor), Internet-of-Things (IoT) devices, and access points having Wi-Fi, 3rd Generation Partnership Project Long-Term Evolution (3GPP LTE), or Fifth Generation New Radio (5G NR) wireless communication capabilities.

Example Devices

Figure 2:
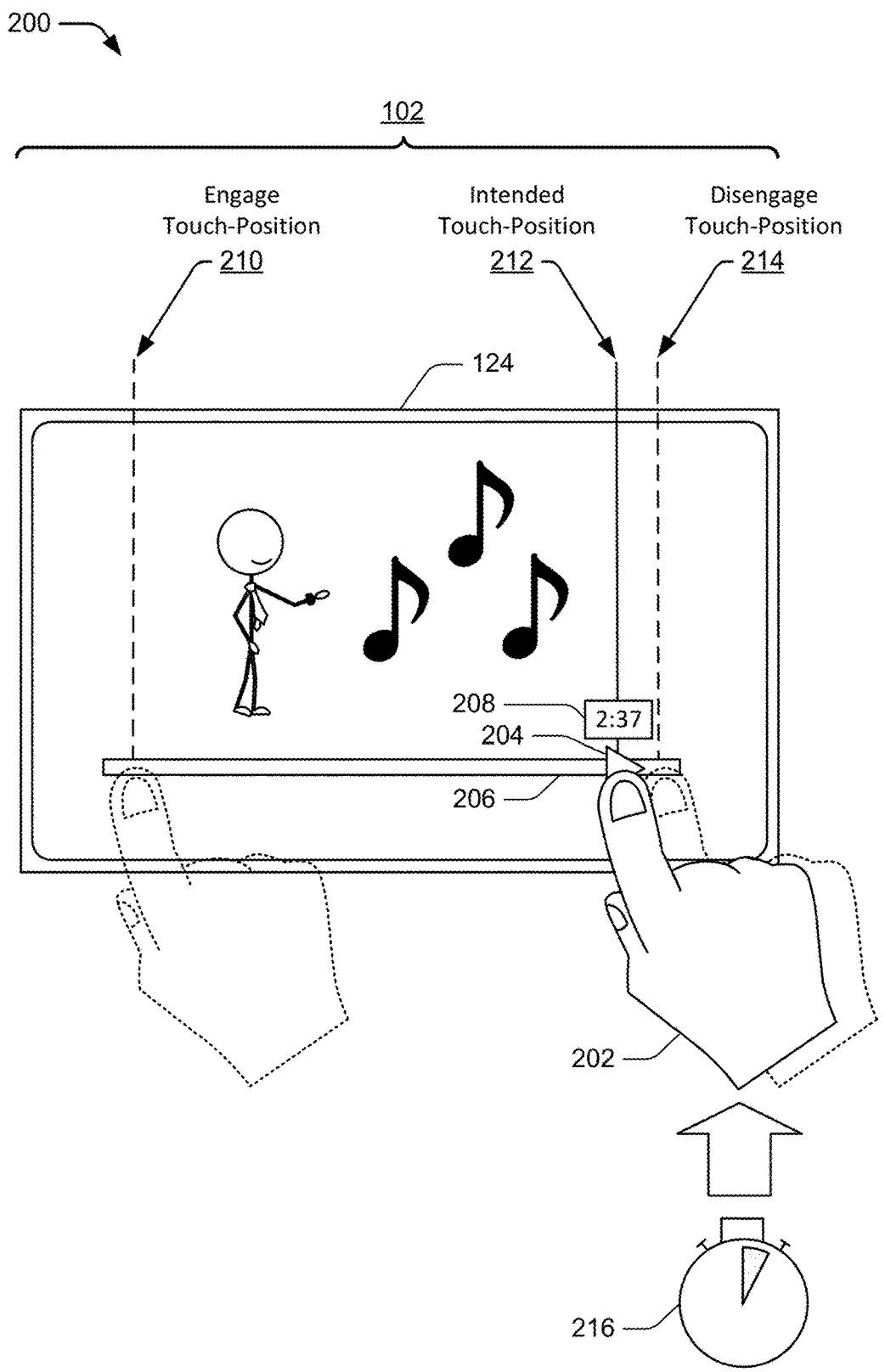
FIG. 2 illustrates example details of a computing device having a touchscreen in accordance with one or more aspects.

FIG. 2 illustrates example details 200 of a computing device having a touchscreen in accordance with one or more aspects. The computing device may be the computing device 102 of FIG. 1 and include one or more elements of FIG. 1.

As illustrated in FIG. 2, the computing device 102 is a tablet and the user interface (e.g., the user interface 122) is a touchscreen that includes the display 124 with the position-detection mechanism 126 integrated into the display 124. In this instance, the position-detection mechanism 126 that is integrated into the display 124 is an input mechanism to the user interface 122 that may use a capacitive, resistive, reflective, or grid-interruption technology.

The display 124 is presenting a music video that a media player application is playing (the media player application may be local to the computing device 102 or accessed through a cloud-based service provider). As illustrated, a hand 202 of the user is performing a gesture relative to the touchscreen, moving a cursor 204 along a progress bar 206 associated with the media player application.

As illustrated, the user is making a gesture where a finger of the hand 202 scrolls the cursor 204 along the progress bar 206 to locate an intended input (e.g., the intended input is to trigger playing the music video at time marker 208 and corresponding to the 2:37 of the music video). The gesture includes several touch positions, including an engage touch-position 210, an intended touch-position 212 (corresponding to the intended input), and a disengage touch-position 214. In some instances, as the user disengages his finger from the touchscreen at an end of the gesture, a biomechanical performance of the user may include the user "rolling" his finger and disengaging from the touchscreen at the disengage touch-position 214. In other instances, as the user disengages his finger from the touchscreen, the biomechanical performance of the user may include the user's finger "sticking" to the touchscreen at the end of the gesture and introduce additional movement that results in the disengage touch-position 214. In turn, and in such instances, the computing device 102 may provide the disengage touch-position 214 to the media player application and erroneously trigger playing of the music video at a time that does not correspond to that of the time marker 208 (e.g., the intended input by the user).

To prevent the erroneous triggering or the playing of the video, the position-detection manager 120 (e.g., the processor 114 executing the instructions of the position-detection manager 120) can direct the computing device 102 perform a series of operations to determine the intended input by the user. In some instances, the series of operations, performed by elements of the computing device 102 (e.g., the position-detection mechanism 126 and the processor 114 executing the instructions of the position-detection manager 120) can include detecting positions associated with the gesture (where the user makes the gesture relative to the touchscreen) and associating, to the positions associated with the gesture, a timing profile.

In the example of FIG. 2, the timing profile includes a time period 216, during which a portion of the gesture is static (e.g., stationary and without movement or very little movement) at the intended touch-position 212. The position-detection manager 120 (e.g., the processor 114 executing the instructions of the position-detection manager 120) may weight this the time period 216 during computations and determine that the time period 216 is indicative of the intended input.

After determining the intended input, the computing device 102 may perform an operation. In some instances, performing the operation may include the computing device 102 providing the determined, intended input to an application that is either local to the computing device 102 (e.g., stored in the CRM 118) or accessed remotely by the computing device 102 (e.g., an application that is accessed through a cloud-based service provider or the like). Providing the intended input to the application may, in turn, launch the application, select a variable presented by the application, or terminate the application. In other instances, performing the operation may include performing a control function associated with the touchscreen, such as zooming a display of the touchscreen or changing a brightness of the touchscreen.

In the instance illustrated by FIG. 2, the computing device 102 performs an operation that corresponds to providing the media player application the determined, intended input corresponding to the intended touch-position 212. In response, the media player application presents the video at a time corresponding to the intended time marker 208.

The computing device 102 may, in some instances, store the timing profile in a buffer that is part of the CRM 118. The computing device 102 may then recall the stored, determined timing profile after detecting other positions associated with another gesture to determine another intended-touch location corresponding to another intended input.

In general, the position-detection mechanism 126 using the capacitive, resistive, reflective, or grid-interruption technology has an inherent gauge capability (e.g., repeatability and reproducibility) that can be associated with a detected position. In certain instances, the computing device 102 may use that capability in determining the intended input corresponding to the intended touch-position 212. For example, if the inherent gauge capability is less precise than a variance in position that would affect a function selected through a gesture, the computing device 102 can select, as the likely intended input, an average of positions or select based on the time spent at a position nearest which of multiple positions that would affect the function. Context, as noted elsewhere herein, may also be used to determine the intended input.

Figure 3:
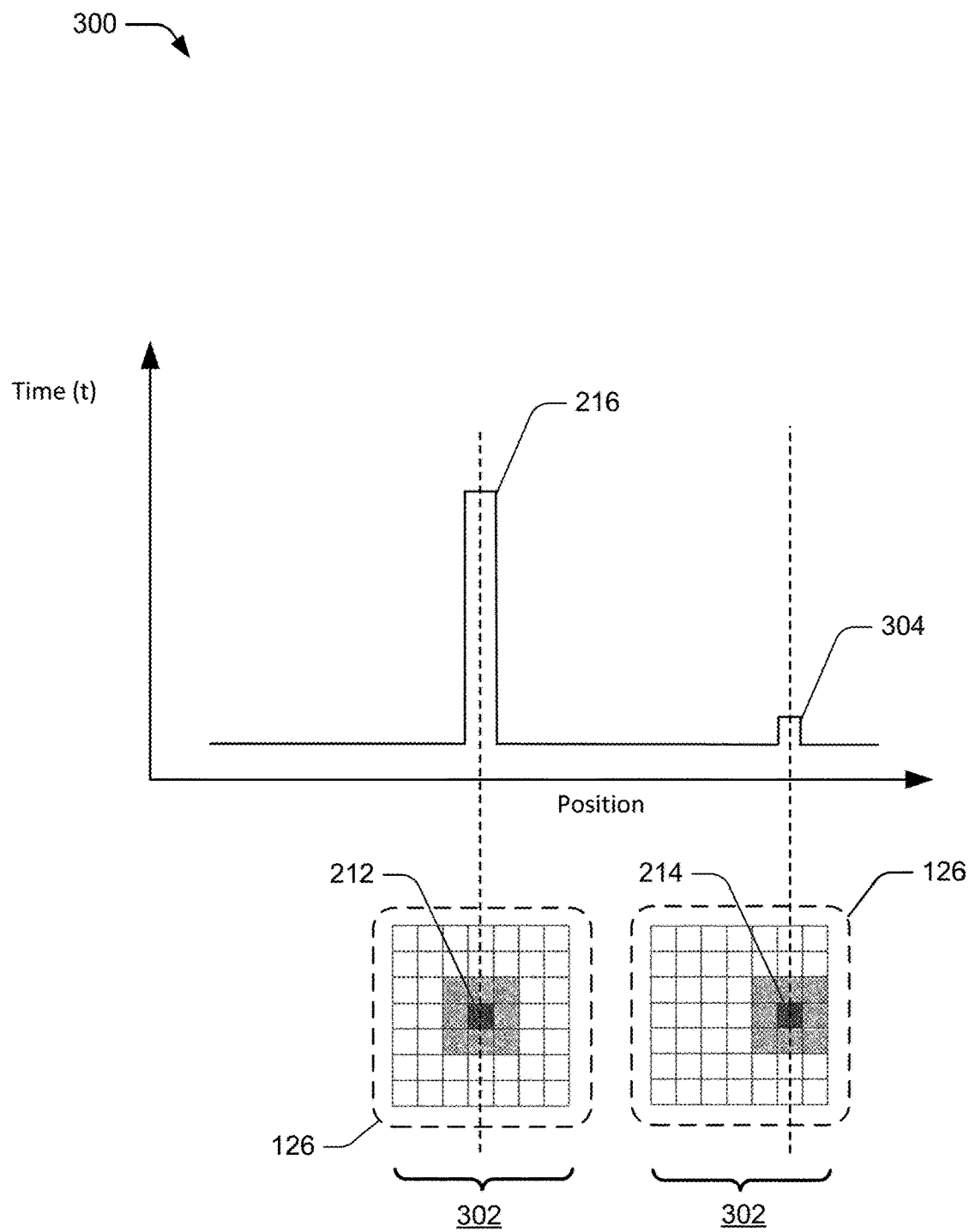
FIG. 3 illustrates details of an example timing profile in accordance with one or more aspects.

FIG. 3 illustrates details of an example timing profile 300 in accordance with one or more aspects. The computing device 102 of FIG. 1 (e.g., the processor 114 executing the instructions of the position-detection manager 120) may perform operations to manage the timing profile 300 in accordance with aspects of FIGS. 1 and 2.

As illustrated by FIG. 3, the position-detection mechanism 126 of the computing device 102 uses a capacitive-sensing technology. An array of touch-cells 302 that is disposed over a surface of the display 124 includes electrodes of a transparent, conductive material, such as an indium tin oxide. As the user touches the array of touch-cells 302 with his finger, the position-detection manager 120 may use sensed differences in mutual capacitance across the array of touch-cells 302 to compute a touch position. The computing of the touch position may, for example, weight an average of the sensed differences in mutual capacitance, as well as implement one or offsets that may be necessary for a perceptual correction (e.g., the user may "perceive" he is touching the computing device 102 at one location, where in actuality, and due to angular positioning of the computing device relative to the user's viewpoint, he is touching the computing device 102 at another location that is offset from the perceived location).

As illustrated, the intended touch-position 212 corresponds to the time period 216, whereas the disengage touch-position 214 (e.g., due to the user "rolling" his finger), corresponds to another time duration 304 that is less than that of the time period 216. In addition to the time period 216 and the other time duration 304, the computing device 102 may aggregate additional time durations to develop the timing profile 300. As with this example instance, the computing device 102 determines, based on the timing profile 300, that the intent of the user is to provide an input that corresponds with the intended touch-position 212.

Although FIG. 3 illustrates time durations that correspond to static positions of the gesture, variations are possible. For example, a motion vector associated with a swipe or scrolling gesture (e.g., motion vectors that include components of direction, velocity, and/or acceleration and detected by the position-detection mechanism 126) may disengage from the touchscreen prior to "arriving" at a desired icon or menu item that is displayed on the display 124. In such an instance, and based on the motion vector, the computing device 102 (e.g., the processor 114 executing the code of the position-detection manager 120) may determine that the intended input is that of selecting the desired icon or menu item.

In some instances, determining the intended input may include the computing device 102 (e.g., the processor 114 executing the instructions of the position-detection manager 120) associating a context to the detected positions. Sensors of the computing device 102 (e.g., the sensors 116) may detect a condition surrounding the device to provide a basis for the context. The computing device 102 may also use machine learning algorithms of the position-detection manager 120 (such as a neural network algorithm), in combination with data stored in the buffer of the position-detection manager 120 (e.g., previous timing profiles or contexts associated with detected positions), to associate the context to the detected positions. Contexts can include an identity of a user, a past behavior of the user, a location of the computing device 102, or a time of day.

Figure 4:
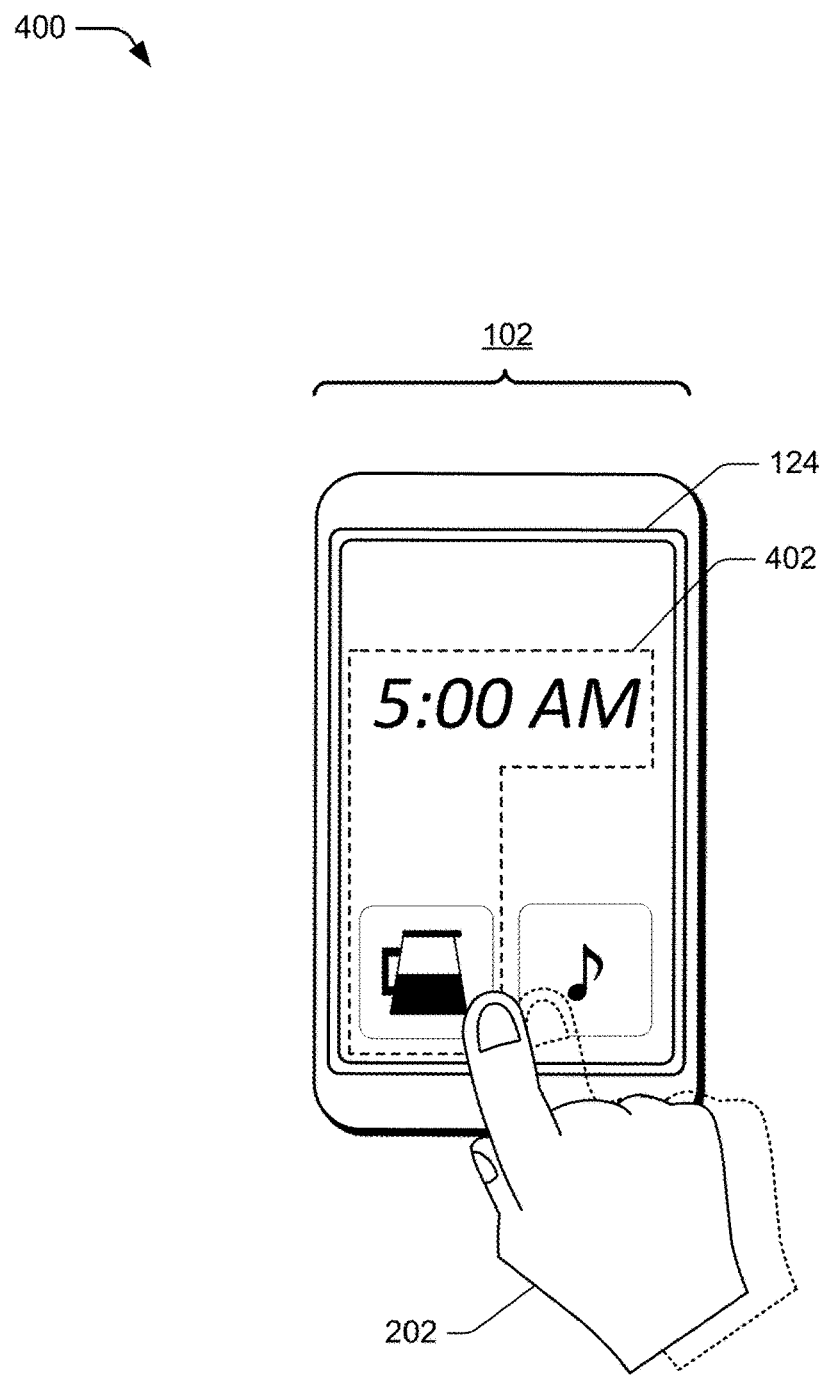
FIG. 4 illustrates details of an example context in accordance with one or more aspects.

FIG. 4 illustrates details of an example context 400 in accordance with one or more aspects. The computing device 102 of FIG. 1 (e.g., the processor 114 executing the instructions of the position-detection manager 120) may perform operations to determine the context using aspects of FIGS. 1-3. FIG. 4 illustrates the computing device 102 as a smartphone. In this instance, the user interface 122 of the computing device 102 is a touchscreen that is an input mechanism to the computing device 102.

As illustrated by FIG. 4, the user awakens at 5 AM with the intent of turning on his coffee pot. As the hand 202 of the user gestures to (e.g., touches) the user interface 122 of the computing device 102, a gesture position (e.g., a touch-position of the user's finger touching a touchscreen of the computing device 102) may be "between" icons that the display 124 of the computing device 102 is presenting. Based on context information 402 that includes a past behavior of the of the user (e.g., a tendency to turn on the coffee pot) at a time of day (e.g., at 5 AM), the computing device 102 (e.g., the processor 114 executing the code of the position-detection manager 120) may determine that the intent of the user (who is not fully awake) is to provide an input that that corresponds to selecting a home-automation icon to turn on the coffee pot, and not provide an input that corresponds to selecting a media-player icon that is proximate to the home-automation icon.

The sensors 116 of the computing device 102 may detect one or more conditions surrounding the computing device 102 and present the detected one or more conditions as context information 402 for use by the computing device 102. These conditions include information about the user interface, the computing device, the user, peripherals, or activities being or to be performed by the any of these entities or applications running on them. Thus, the conditions may include a user interface being a touch or radar-based interface having differing precision and accuracy (and thus the context information 402 can indicate this differing precision and accuracy). Other conditions include the user having small, thin finger tips or heavy, wide finger tips (and thus the context information 402 can indicate a higher accuracy for the thin fingers). Furthermore, other conditions include peripherals that vary, such as an oven, speakers, or television, or applications, which can be indicated by the context information 402 indicating the same. In more detail, conditions may include a location of the computing device 102 (e.g., a GPS sensor may determine that the computing device is at a user's house), an identity of the user (e.g., an RFID sensor may identify the user), and a status of the computing device 102, application running on the computing device 102, or a peripheral (e.g., the coffee pot may communicate with the computing device 102 via an NFC sensor and indicate that is prepared with water, coffee, and available to activate).

In some instances, contexts may be determined and provided to the computing device 102 by other devices through the wireless interface 130 and input/output (I/O) ports 132. Examples of the other devices include servers, cloud-based computing devices, or IoT devices.

The computing device 102 may also store the determined context in a buffer that is part of the CRM 118. The computing device 102 may then recall the stored, determined context when detecting other positions associated with another gesture and determining another intended input.

Furthermore, and in general, associating contexts to positions detected relative to the touchscreen may use a machine-learning algorithm. The computing device 102 (e.g., the processor 114 executing instructions contained within the position-detection manager 120) may effectuate one or more machine-learning algorithms that account for variables that include a past behavior of the user, past gestures, a location of the computing device, a time of day, an identity of the user, or an environment surrounding the computing device 102. As an example, the machine-learning algorithm can adhere to a model that corresponds to a neural network, where the neural network includes an input layer to receive the contexts (e.g., the past behavior of the user, the past gestures, the location of the computing device, the time of day, the identity of the user, or the environment surrounding the computing device), hidden layers for exchanging information to train the model, and an output layer. Other examples of machine-learning algorithm models include a decision tree model and a reinforcement-learning model.

Figure 5:
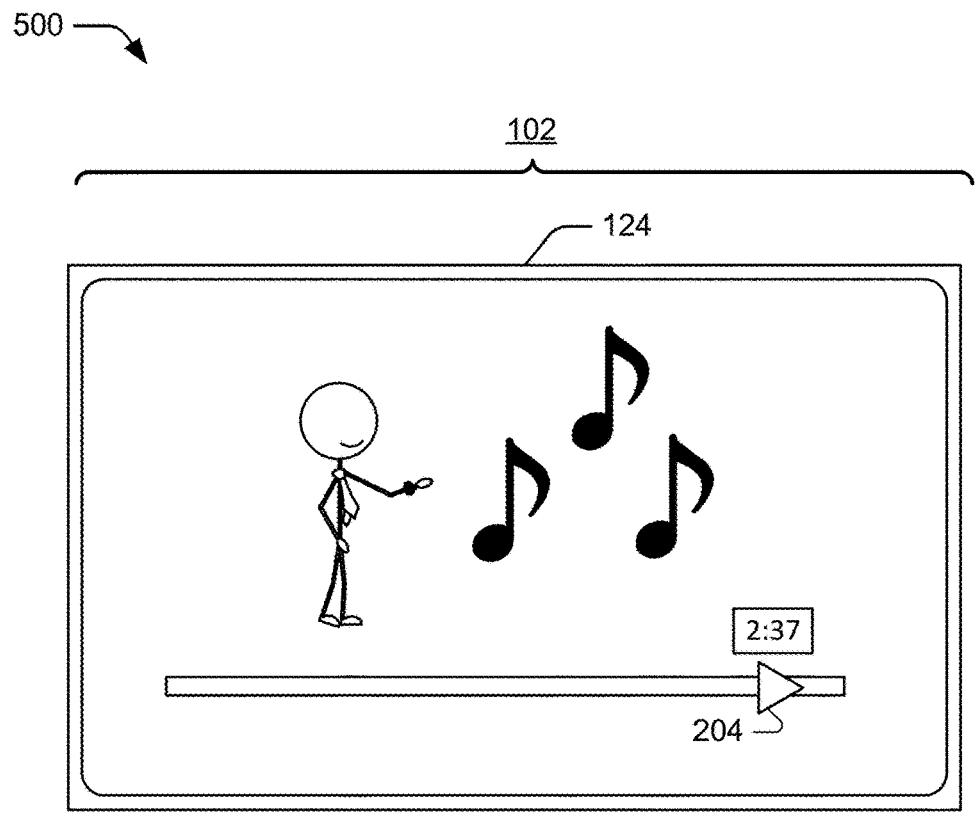
FIG. 5 illustrates example details of a computing device and input mechanisms in accordance with one or more aspects.
Figure 5:
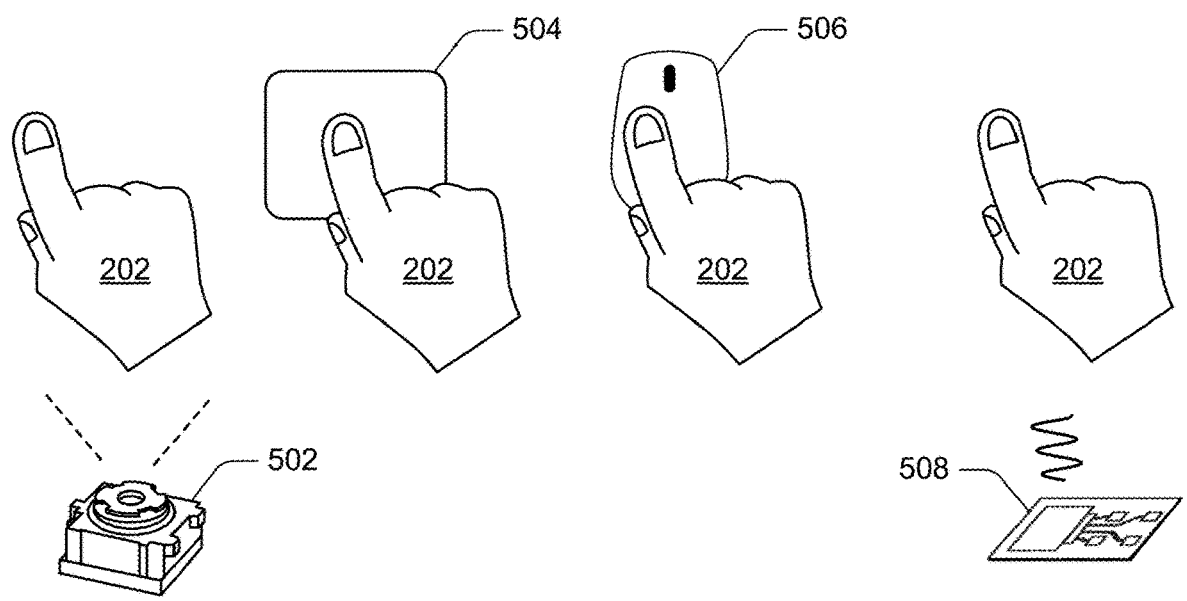

FIG. 5 illustrates example details 500 of a computing device and input mechanisms in accordance with one or more aspects. The computing device may be the computing device 102 of FIG. 1 and include one or more elements of FIGS. 1-4. The input mechanisms may be other than an input mechanism that is integrated as part of a touchscreen.

As illustrated in FIG. 5, the computing device 102 is a tablet and the user interface (e.g., the user interface 122) includes the display 124 and input mechanisms 502-508. Similarly to FIG. 2, the display 124 is presenting the music video that the media player application is playing. As illustrated, each of the input mechanisms 502-508, in combination with a driver or other executable instructions contained within position-detection manager 120, can be the position-detection mechanism 126 of the user interface 122 and control a position of the cursor 204.

A first example of an input mechanism is an image sensor 502. The image sensor 502 may be a charge-coupled device (CCD) or complimentary metal-oxide semiconductor (CMOS) image sensor. With this first, example input mechanism, and as opposed to a mechanism that senses a touch-position, the image sensor 502 may capture and provide, to the computing device 102, images of a gesture made by the hand 202. The position-detection manager 120, in this first example instance, may include image recognition code or instructions that, upon execution by the processor 114, can identify changes in a position of the hand 202 (e.g., a finger of the hand) relative to a background. This can include, in some instances, identifying changes that are associated with a two-dimensional (2D) position as well as a three-dimensional (3D) position.

A second example of an input mechanism is a touchpad 504. The touchpad 504 may be included in a keyboard that is communicating with the computing device 102 through either the wireless interface 130 or the I/O ports 132. The touchpad 504 may use a capacitive sensing technology or a conductive sensing technology. In some instances, the touchpad 504 may include a touchpad button or a touchpad joystick. The position-detection manager 120, in this second example, may include code or instructions that, upon execution by the processor 114, identify changes in a position of the hand 202 (e.g., a finger of the hand) relative to the touchpad or changes that might be associated with the touchpad button or the touchpad joystick.

A third example of an input mechanism is a mouse 506. The mouse 506 may include a light-emitting diode (LED) coupled with a photocell to track a movement of the mouse 506 relative to a surface. The mouse 506 may communicate with the computing device 102 through either the wireless interface 130 or the I/O ports 132. The mouse 506 may, in some instances, include a mouse-scrolling wheel and/or selection mechanisms. The position-detection manager 120, in this third example, may include code or instructions that, upon execution by the processor 114, identifies changes in a position of the mouse 506 that is under the guidance of the hand 202.

A fourth example of an input mechanism is a radar sensor 508. The radar sensor 508 may emit a radar field and receive reflections of the emitted radar field to determine changes in a position of the hand 202 (e.g., the finger of the hand 202). Similarly to the image sensor 502, the radar sensor 508 may identify changes that are associated with a two-dimensional (2D) position as well as a three-dimensional (3D) position.

In general, the example input mechanisms 502-508 each has an inherent gauge capability (e.g., repeatability and reproducibility) that can be associated with a detected position. In certain instances, the computing device may use this gauge capability when determining the intended input, as noted above.

Furthermore, and as noted with the touchscreen of FIG. 2, the computing device 102 (e.g., the processor 114 executing the instructions of the position-detection manager 120) can combine a context with positions received through one or more of the input mechanisms 502-508.

Example Methods

Example methods 600 and 700 are described with reference to FIGS. 6 and 7 in accordance with one or more aspects of determining an intended input to a user interface from detected gesture positions. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
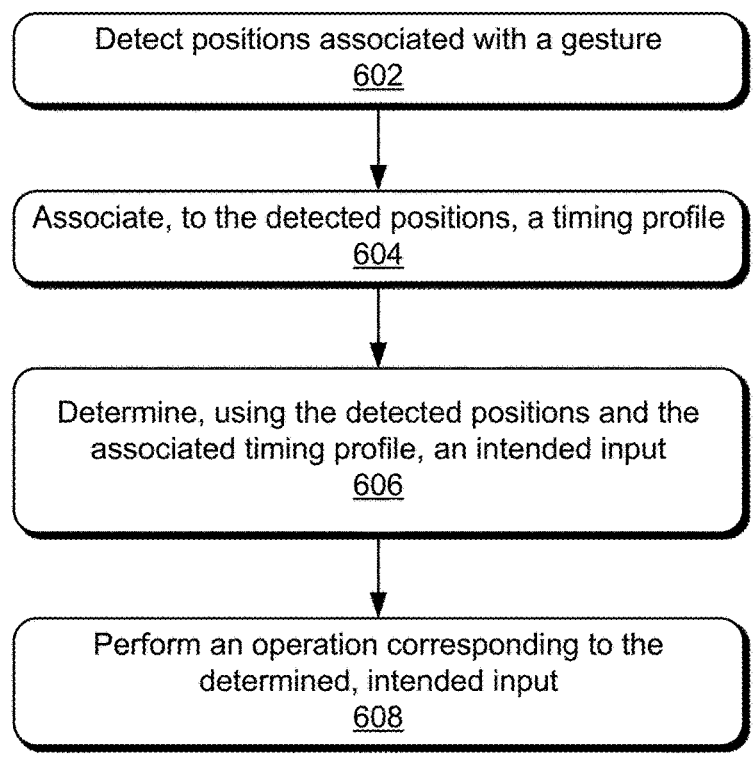
FIG. 6 illustrates an example method performed by a computing device to determine an intended input to a user interface from detected gesture inputs.

FIG. 6 illustrates an example method 600 performed by a computing device to determine an intended input to a user interface from detected gesture inputs. The computing device may be the computing device 102 of FIG. 1, using elements of FIGS. 1-3.

At block 602, the computing device detects positions associated with a gesture that is made by a user of the computing device, where the gesture is made relative to a touchscreen of the computing device.

At block 604, the computing device associates, to the detected positions, a timing profile. In some instances, associating the timing profile to the positions detected relative to the touchscreen identifies a static position associated with a portion of the gesture, where the static position corresponds to the gesture remaining stationary at one of the detected positions for a period of time.

In some instances, the period of time may be a predetermined period of time that is measured in seconds, such a predetermined period of time that ranges from 0.1 s to 0.5 s near an end of a gesture. The predetermined period of time may also correspond to a time that is immediately after the user first engaging (e.g., touching his finger to) or immediately prior to the user disengaging (e.g., lifting his finger from) the touchscreen. Thus, a static position can be set as one at which the user, for example, remained static at a time from 0.7 to 0.9 seconds (with 0.0 being when the user's fingered first engaged) when the user disengaged at 1.0 seconds. In other instances, the period of time may be a relative period of time, such as a period of time that is a longest period of time in relation to multiple periods of time associated with multiple, static positions associated with other portions of the gesture. Thus, assume that a gesture lasts 0.7 total seconds, and the longest static positions are 0.25, 0.2, 0.2, and 0.1 seconds. The longest period, and therefore the period having an assumed highest priority, would by the position at which the user's finger was static for 0.25 seconds.

Associating the timing profile to the positions detected relative to the touchscreen may include identifying motion vectors associated with the gesture. The motion vectors may include parameters corresponding to a velocity, a direction, or an acceleration of the gesture. In some instances, the timing profile can identify a weighted average of detected positions associated with a portion of a motion vector having a low relative-velocity (in comparison to other detected positions associated with another portion of the motion vector having a high relative-velocity) in lieu of identifying a static (e.g., stationary) position. Thus, a user's finger moving slowly, indicates a greater likelihood of the user's intention being to select the positions at or ending the slow-moving part of the gesture.

Associating the timing profile to the detected positions may include identifying a type of touch-position for the detected positions. For example, the type of touch-position may correspond to an engage touch-position, where the user touches his finger to the touchscreen, or to a disengage touch-position, where the user lifts his finger from the touchscreen. Other types of touch-positions include a "back-and-forth" touch-position detected over another period of time (e.g., indicating that the user may be trying to "zero in" on a selection) or detecting a "multiple touch" touch-position over another period of time (e.g., indicating reselections due to input errors, a level of interest from the user, and the like).

At block 606, using the detected positions and the associated timing profile, the computing device determines an intended input by the user. In some instances, the determined, intended input may correspond to a position at which the user intends to disengage from the touchscreen. In other instances, the determined, intended input may correspond to a position at which the user intends to engage with the touchscreen, such as an icon or a menu item presented by a display of the touchscreen.

At block 608, the computing device performs an operation corresponding to the determined, intended input. In some instances, performing the operation may include providing an input to an application that launches the application, selects a variable presented by the application, or terminates the application. In other instances, performing the operation may include performing a control function associated with the touchscreen, such as zooming a display of the touchscreen or changing a brightness of the display of the touchscreen.

Figure 7:
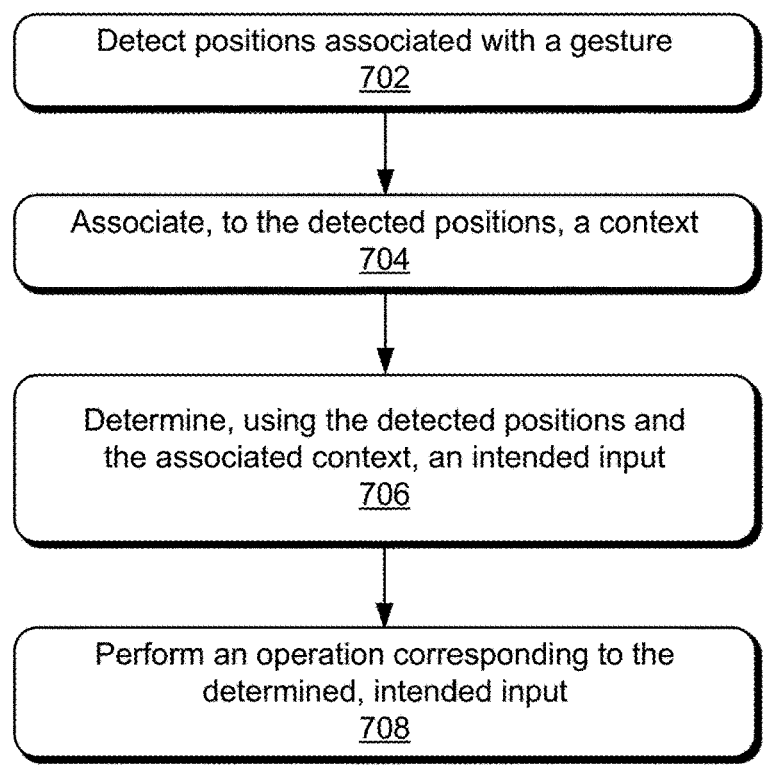
FIG. 7 illustrates another example method performed by a computing device to determine an intended input to a user interface from detected gesture inputs.

FIG. 7 illustrates another example method 700 performed by a computing device to determine an intended input to a user interface from gesture positions. The computing device may be the computing device 102 of FIG. 1, using elements of FIGS. 1 and 4.

At block 702, the computing device detects positions associated with a gesture that is made by a user of the computing device, where the gesture is made relative to a touchscreen of the computing device.

At block 704, the computing device associates, to the detected positions, a context. In some instances, associating the context to the positions detected relative to the touchscreen of the computing device may include one or more sensors of the computing device sensing a condition surrounding the computing device, such as an identity of the user or a location of the computing device.

At block 706, using the detected positions and the associated context, the computing device determines an intended input by the user. Determining the intended input by the user may use a machine-learning algorithm executed by a processor of the computing device, where the machine-learning algorithm accounts for variables that include a past behavior of the user, a location of the computing device, or a time of day. In some instances, the machine-learning algorithm may adhere to a neural network model.

At block 708 the computing device performs an operation corresponding to the determined, intended input. In some instances, performing the operation may include providing an input to an application that launches the application, selects a variable presented by the application, or terminates the application. In other instances, performing the operation may include performing a control function associated with the touchscreen, such as zooming a display of the touchscreen or changing a brightness of the display of the touchscreen.

Although aspects of determining an intended input to a user interface from detected gesture positions have been described in language specific to features and/or methods, the appended claims are not necessarily limited to the specific features or methods described. Rather, the specific features and methods are disclosed as example implementations of determining an intended input to a user interface from detected gesture positions, and other equivalent features and methods are intended to be within the scope of the appended claims. Furthermore, various different aspects are described and it is to be appreciated that each described aspect can be implemented independently or in connection with one or more other described aspects.

What is claimed is:

1. A computing device comprising:
   a user interface having a display;
   a position-detection mechanism;
   a processor; and
   a computer-readable media having executable instructions of a position-detection manager that, when executed by the processor, direct the computing device to:
   detect, through the position-detection mechanism, respective positions associated with multiple portions of a gesture, the gesture made by a user of the computing device relative to the user interface, the multiple portions of the gesture including at least a first portion of the gesture and a subsequent second portion of the gesture;
   detect a context of usage for the computing device or an application of the computing device for which the position-detection manager is configured to receive input;
   associate, to the detected respective positions of the gesture, a timing profile and the context of usage for the computing device or the application, the timing profile including:
   a first duration of time during which the first portion of the gesture is static and remains stationary at a first touch-position; and
   a second duration of time during which the subsequent second portion of the gesture is static and remains stationary at a second touch-position that is different than the first touch-position;
   determine, based on the context associated with the timing profile and in response to the first duration of time of the first portion of the gesture exceeding the second duration of time of the subsequent second portion of the gesture, that an intended input made by the user corresponds to the first touch-position of the first portion of the gesture; and
   direct the processor or the application of the computing device to perform an operation corresponding to the intended input as determined based on the timing profile and context associated with the detected respective positions of the gesture.

2. The computing device of claim 1, wherein the computing device is configured to detect the context of usage for the computing device or the application of the computing device using a sensor of the computing device that is a GPS sensor, a proximity sensor, an accelerometer, a radar sensor, a radio-frequency identification (RFID) sensor, or a near-field communication (NFC) sensor.

3. The computing device of claim 1, wherein the position-detection mechanism includes:
   an input mechanism that is a mouse, a mouse-scrolling wheel, a touchpad, a touchpad button, or a touchpad joystick; and
   determining the intended input includes using a gauge capability of the mouse, the mouse-scrolling wheel, the touchpad, the touchpad button, or the touchpad joystick.

4. The computing device of claim 1, wherein the position-detection mechanism includes an input mechanism that is a radar sensor and determining the intended input includes using a gauge capability of the radar sensor.

5. The computing device of claim 1, wherein the position-detection mechanism includes an input mechanism that is an image sensor and determining the intended input includes using a gauge capability of the image sensor.

6. The computing device of claim 1, wherein the user interface including the display combines with the position-detection mechanism to form a touchscreen.

7. The computing device of claim 6, wherein the position-detection mechanism uses a capacitive, resistive, reflective, or grid-interruption technology and determining the intended input includes using a gauge capability of the position-detection mechanism for the capacitive, reflective, or grid interruption technology.

8. The computing device of claim 1, wherein:
   the computing device includes a sensor that detects an operating condition of the computing device; and
   the computing device is configured to:
   determine, based on input received from the sensor, the operating condition of the computing device, and
   determine, based on the operating condition of the computing device, the context of usage for the computing device or the application of the computing device that is associated to the detected respective positions of the gesture.

9. The computing device of claim 8, wherein the detected operating condition of the computing device is a location of the computing device.

10. The computing device of claim 8, wherein the detected operating condition of the computing device is an identity of a user of the computing device.

11. A method performed by a computing device comprising:
   identifying multiple portions of a motion vector associated with a gesture made by a user of the computing device relative to a touchscreen of the computing device, the multiple portions of the motion vector including at least a first portion of the motion vector that corresponds to a first set of one or more touch-cells of the touchscreen and a subsequent second portion of the motion vector that corresponds to a second set of one or more of the touch-cells of the touchscreen;
   associating, to the motion vector, a timing profile that includes a first duration of time associated with the first portion of the motion vector and a second duration of time associated with the second portion of the motion vector;
   comparing the first duration of time associated with the first portion of the motion vector to the second duration of time associated with the second subsequent portion of the motion vector;
   determining, in response to the first duration of time exceeding the second portion of time, that the first portion of motion vector associated with the gesture corresponds to an intended input made by the user; and
   performing an operation corresponding to the determined, intended input, wherein performing the operation that corresponds to the determined, intended input includes providing the input to an application of the computing device that launches the application, selects a variable presented by the application, or terminates the application.

12. The method of claim 11, wherein determining the intended input by the user is further based on a location offset applied to the first set of one or more touch-cells of the first portion of the motion vector or the second set of one or more touch-cells of the second portion of the motion vector to correct a perceptual location, the perceptual location based on angular positioning of the touchscreen of the computing device relative to a viewpoint of the user.

13. The method of claim 11, wherein the determining the intended input made by the user is further based on an operating condition the computing device.

14. The method of claim 13, wherein the operating condition of the computing device includes a width of respective fingertips of the user of the computing device.

15. The method of claim 11, wherein the application is a media player application.

16. The method of claim 11, wherein:
   identifying the first set of one or more touch-cells of the first portion of the motion vector comprises identifying the first set of one or more touch-cells as a first weighted average of positions detected via the touchscreen; or
   identifying the second set of one or more touch-cells of the second portion of the motion vector comprises identifying the second set of one or more touch-cells as a second weighted average of positions detected via the touchscreen.

17. The method of claim 16, further comprising:
   identifying, based on the timing profile and the first weighted average of detected positions, the first portion of the motion vector as a low relative-velocity motion vector portion for determining the intended input of the user; or
   identifying, based on the timing profile and the second weighted average of detected positions, the second portion of the motion vector as a high relative-velocity motion vector portion for determining the intended input of the user.

18. A computer-readable media storing executable instructions of a position-detection manager that, when executed by a processor, direct a computing device to:
   identify multiple portions of a motion vector for a swipe or scrolling gesture made by a finger engaged to a touchscreen of the computing device, the multiple portions of the motion vector including at least a first portion of the motion vector and a subsequent second portion of the motion vector;
   associate, to the motion vector, a timing profile that includes a first duration of time associated with the first portion of the motion vector and a second duration of time associated with the second portion of the motion vector;
   compare the first duration of time associated with the first portion of the motion vector to the second duration of time associated with the second subsequent portion of the motion vector;
   determining, in response to the first duration of time exceeding the second portion of time, that the first portion of motion vector associated with the swipe or scrolling gesture corresponds to an intended input made by the user; and
   perform an operation corresponding to the intended input made by the user to complete the swipe or scrolling gesture, the intended input not using or including the second portion of the motion vector.

19. The computer-readable media of claim 18, wherein the instructions of the position-detection manager further direct the computing device to determine the intended input based on an operating condition of the computing device.

20. The computer-readable media of claim 19, wherein the operating condition of the computing device includes at least one of:
   a location of the computing device;
   an identity of a user of the computing device; or
   a peripheral device communicating with the computing device.

* * * * *